(12) United States Patent
Zerrouk et al.

(10) Patent No.: US 9,310,493 B2
(45) Date of Patent: Apr. 12, 2016

(54) CRYSTAL BLOCK ARRAY AND METHOD OF MANUFACTURE

(71) Applicant: Zecotek Imaging Systems Singapore Pte Ltd., Singapore (SG)

(72) Inventors: Abdelmounaime Faouzi Zerrouk, Lausanne (CH); Azman Mohd Ariffin, Singapore (SG)

(73) Assignee: ZECOTEK IMAGING SYSTEMS SINGAPORE PTE LTD., Singapore (SG)

( * ) Notice: Subject to any disclaimer, the term of this patent is extended or adjusted under 35 U.S.C. 154(b) by 121 days.

(21) Appl. No.: 14/051,328

(22) Filed: Oct. 10, 2013

(65) Prior Publication Data

US 2014/0099465 A1    Apr. 10, 2014

Related U.S. Application Data

(60) Provisional application No. 61/712,181, filed on Oct. 10, 2012.

(51) Int. Cl.
*G01T 1/202* (2006.01)
*B32B 3/00* (2006.01)
(Continued)

(52) U.S. Cl.
CPC . *G01T 1/202* (2013.01); *B32B 3/10* (2013.01); *B32B 17/00* (2013.01); *B32B 33/00* (2013.01); *B32B 37/02* (2013.01); *B32B 38/0004* (2013.01);
(Continued)

(58) Field of Classification Search
CPC .................. Y10T 156/1079; Y10T 156/1075; Y10T 156/1062; Y10T 156/1059; Y10T 156/1052; Y10T 156/10; Y10T 156/1322; Y10T 156/1317; Y10T 156/13; Y10T 156/12; Y10T 156/14; Y10T 428/16; Y10T 428/162; G09G 3/003; B32B 33/00; B32B 37/02; B32B 37/12; B32B 37/14; B32B 38/0004; B32B 38/04; B32B 2038/0064; B32B 2038/0068; B32B 2038/045; B32B 2037/1253; A61B 6/40; A61B 6/4208; A61B 6/4275; A61B 6/48
USPC .......... 378/4–9, 11–20; 125/12, 23.01, 30.01; 83/12, 14, 23, 29, 42, 43, 56; 156/264
See application file for complete search history.

(56) References Cited

U.S. PATENT DOCUMENTS 5,091,650 A     2/1992  Uchida et al.
6,749,761 B1 *  6/2004  Andreaco ............... G01T 1/202
                                              216/24

(Continued)

OTHER PUBLICATIONS

Kent Burr, Adrian Ivan, Don Castleberry, Jim LeBlanc, Design of Scintillator Arrays for Dual-End Depth-of-Interaction Encoding Small-Animal PET Detectors, Jul. 27, 2007.

(Continued)

*Primary Examiner* — Linda L Gray
(74) *Attorney, Agent, or Firm* — Davis Wright Tremaine LLP; Dylan O. Adams

(57) ABSTRACT

A novel method of making a crystal block array (configured for coupling with photodetectors as part of an integrated detector module useful in advanced PET scanner systems) is disclosed herein. The novel method comprises a series of cutting, polishing, and assembling steps that utilize a curable bonding agent, removable wire spacers, and a series removable protective glass end plates. The crystal block arrays disclosed herein may be of various dimensions and geometries and are amenable to mass production.

13 Claims, 4 Drawing Sheets

(51) Int. Cl.

| | | |
|---|---|---|
| *B32B 17/00* | (2006.01) | |
| *B32B 37/12* | (2006.01) | |
| *B32B 38/04* | (2006.01) | |
| *B32B 3/10* | (2006.01) | |
| *B32B 33/00* | (2006.01) | |
| *B32B 37/02* | (2006.01) | |
| *B32B 38/00* | (2006.01) | |

(52) U.S. Cl.
CPC . *B32B 2037/1253* (2013.01); *B32B 2038/0064* (2013.01); *B32B 2038/045* (2013.01); *Y10T 156/1059* (2015.01); *Y10T 156/1075* (2015.01); *Y10T 156/13* (2015.01); *Y10T 428/16* (2015.01)

(56) References Cited

U.S. PATENT DOCUMENTS

| | | |
|---|---|---|
| 6,956,214 B2 * | 10/2005 | Wong et al. .......... 250/368 |
| 2003/0226972 A1 | 12/2003 | Wong et al. |
| 2005/0113536 A1 | 5/2005 | Armstrong et al. |
| 2009/0173885 A1 | 7/2009 | Zeitler et al. |
| 2012/0223252 A1 | 9/2012 | Menge |

OTHER PUBLICATIONS

International Searching Authority, International Search Report (International application No. PCT/IB2013/002779), date of mailing Apr. 10, 2014.

* cited by examiner

CRYSTAL BLOCK ARRAY AND METHOD OF MANUFACTURE

CROSS-REFERENCE TO RELATED APPLICATIONS

This application claims the benefit of priority to U.S. Provisional Application No. 61/712,181 filed on Oct. 10, 2012, which application is incorporated herein by reference in its entireties for all purposes.

TECHNICAL FIELD

The present invention relates generally to scintillation crystals and related crystal block assemblies used in Positron Emission Tomography (PET) scanners and, more particularly, to scintillation crystal block arrays (configured for coupling with photodetectors as part of an integrated detector module useful in advanced PET scanner systems), as well as to methods of making and using high performance scintillation crystal block arrays.

BACKGROUND OF THE INVENTION

In nuclear medicine, scintillation crystals have become important components of medical imaging devices. The performance of these medical imaging devices, including Positron Emission Tomography (PET) scanners, largely depends on the quality and uniformity of scintillation crystals and on related crystal block array assemblies. The costs of making such medical imaging devices is generally expensive. Thus, there is a need to reduce manufacturing costs by simplifying the procedures for making scintillation crystal block arrays.

In a general sense, positron emission tomography is a medical imaging technique in which a patent ingests a radio-actively tagged compound that mimics a naturally occurring compound. For reasons relating to the body's metabolism, the compound tends to accumulate in tumors. The radioactively tagged compound tend to emit gamma rays. The gamma rays can be detected outside of the patient's body. In particular, when the scintillation crystals are struck by a gamma ray, they are likely to emit a photon ("scintillation"). The photon is in turn recognized by a photodetector, which generates an electronic signal. Various hardware and software components use the electronic signal to reconstruct the likely position (within a known tolerance) of the original gamma ray emission. Better crystals and more uniform crystal block arrays provide better information about the gamma rays and thus provide a better image, and help lead to a better diagnosis, and potentially better medical treatment.

Accordingly, and although some progress has made with respect to the development of crystal block arrays, there is still a need in the art for new crystal block arrays and related methods of manufacture.

SUMMARY OF THE INVENTION

The present invention in an embodiment is directed to a novel method of making a crystal block array. The inventive method comprises at least the steps of: providing a selected crystal having a generally cylindrical form (boule); cutting the selected crystal crosswise (perpendicular to longitudinal axis) a plurality of times to yield a plurality of crystal pucks, with each crystal puck having a selected height; cutting at least one of the plurality of crystal pucks along a heightwise direction a plurality of times to yield a plurality of first crystal slabs; polishing the flat surfaces of at least four of the plurality of first crystal slabs to an optical finish; assembling the at least four of the plurality of first crystal slabs in a side-by-side and spaced apart relationship with respect to one another; positioning a plurality of first spacers (wires or nylon strings) between the at least four of the plurality of first crystal slabs and proximate to their edges, thereby defining a first series of first void spaces between the plurality of first crystal slabs; applying a first bonding agent between the at least four of the plurality of first crystal slabs so as to fill the first series of first void spaces, thereby defining a first layered optical block assembly; cutting the first layered optical block assembly along a lengthwise direction a plurality of times to yield a plurality of second crystal slabs of sandwich construction; polishing the flat surfaces of at least four of the plurality of second crystal slabs of sandwich construction to an optical finish; assembling the at least four of the plurality of second crystal slabs of sandwich construction in a side-by-side and spaced apart relationship with respect to one another; positioning a plurality of second spacers (wires or nylon strings) between the at least four of the plurality of second crystal slabs of sandwich construction and proximate to their edges, thereby defining a second series of second void spaces between the plurality of second crystal slabs of sandwich construction; applying a second bonding agent (which may be the same as the first bonding agent) between the at least four of the plurality of second crystal slabs of sandwich construction so as to fill the second series of second void spaces, thereby defining a second layered optical block assembly; and removing the plurality of first and second spacers to yield the crystal block array.

The first and second spacers may be wires composed of nylon and having the same diameters. The first and second bonding agents may a flowable and UV curable cementing compound. In some embodiments, first, second, third, and fourth glass end plates are used to facilitate assembly and construction of the finished crystal block array.

These and other aspects of the present invention will become more evident upon reference to the following detailed description and accompanying drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention (namely, the manufacture of an exemplary 4×4 pixelated crystal block array useful for operations within a PET scanner) and as such are not necessarily drawn to scale. In addition, the relative dimensions and distances depicted in the drawings are exemplary and may be varied in numerous ways. Finally, like reference numerals have been used to designate like features throughout the views of the drawings.

DETAILED DESCRIPTION OF INVENTION

Figure 1A:
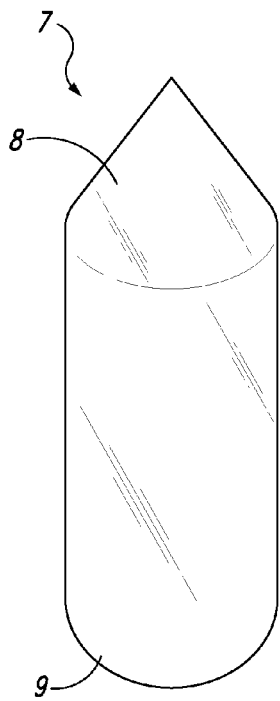
FIG. 1A is a perspective view of a selected crystal boule.
Figure 1B:
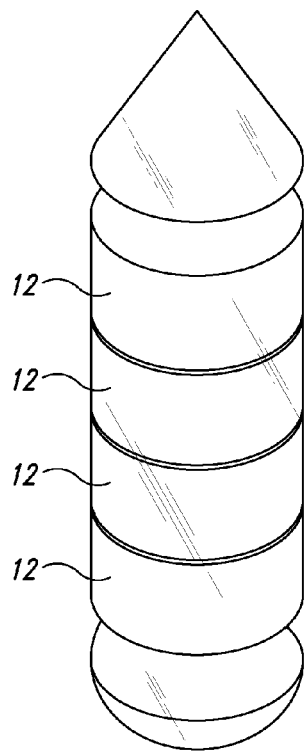
FIG. 1B is a perspective exploded view of the crystal boule shown in FIG. 1A, but wherein the crystal boule has had its top and bottom portions cut-off and removed.

Referring now to the drawings where like numerals have been used to designate like features throughout the views, and more specifically to FIGS. 1A through 10, the present invention in an embodiment is directed to a novel method of making a scintillation crystal block array 10 (as shown in Figures and 9 and 10) adapted for coupling with a planar photodetector array (not shown) as part of an integrated detector module useful in an advanced PET scanner system (not shown). In the inventive method and as an initial step, a crystal boule 7 (FIG. 1A) of an appropriately grown and sized scintillation crystal (such as, for example, a cerium-activated lutetium-based oxyorthosilicate scintillation crystal boule (Ce:LSO and/or Ce:LYSO) grown by the Czochralski method) is first selectively sliced (cut) into a plurality of "pucks" (FIG. 1B). In other words, a selected scintillation crystal boule 7 of a generally cylindrical form is cut a plurality of times along its width (perpendicular to its longitudinal axis) to yield a plurality of pucks 12. The plurality of pucks 12 that are cut (sliced) from the selected cylindrical crystal boule 7 may or may not be of the same height. The cutting or slicing of the crystal boule 7 may be carried out with the aid of an appropriate cutting tool such as, for example, a diamond hardened saw. In addition, the height of each puck 12 is typically selected to be equal to the length of the individual scintillation crystal pixels 11 (utilized in a particular PET scanner) plus a minor allowance for grinding/polishing. Scintillation crystal pixels utilized in advanced PET scanners generally have dimensions of about 4×4×20 millimeters (mm) or about 4×4×22 millimeters (mm) or about 4.7×6.3×30 millimeters (mm), but are not limited to those exemplary dimensions. Accordingly, the present invention is not limited to any particular crystal or pixel dimension or range of dimensions and is applicable to the manufacture of scintillation crystal block arrays of various sizes and dimensions. For example, the inventive method is useful for making all types arrays having any number of rows and columns (2×2, 3×3, 4×4, 4×6, et cetera).

Figure 1C:
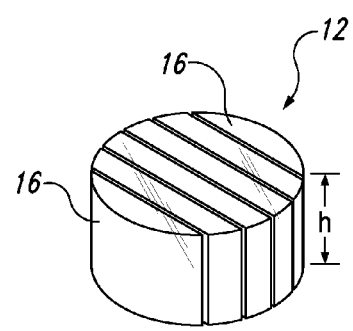
FIG. 1C is a perspective view of one of the crystal pucks shown in FIG. 1B, but wherein the crystal puck has been cut lengthwise a plurality of times to yield a plurality of crystal slabs in accordance with an embodiment of the present invention.
Figure 2:
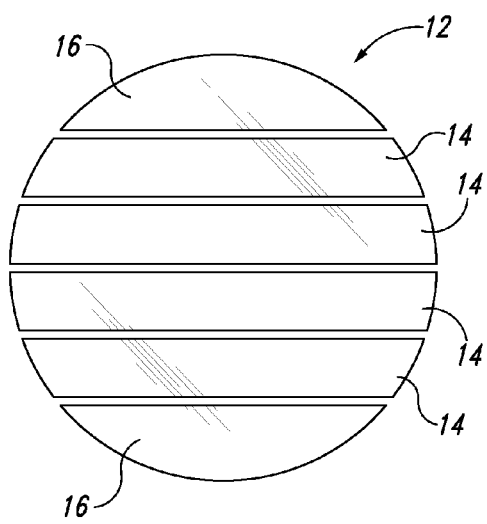
FIG. 2 is a top plan view of the sliced crystal puck shown in FIG. 1C.

As best shown in FIGS. 1C and 2, a puck 12 having a selected height (h) is further sliced (cut) along its height (parallel to its longitudinal axis) to yield a plurality of inner "slabs" 14 positioned between a pair of opposing end slab pieces 16. The pair of opposing end slab pieces 16 are removed and set aside for other applications. The remaining inner slabs 14 are each further lapped and polished on all of their flat surfaces (preferably to at least an optical finish of $\lambda/8$ or better) and readied for further assembly.

Figure 3:
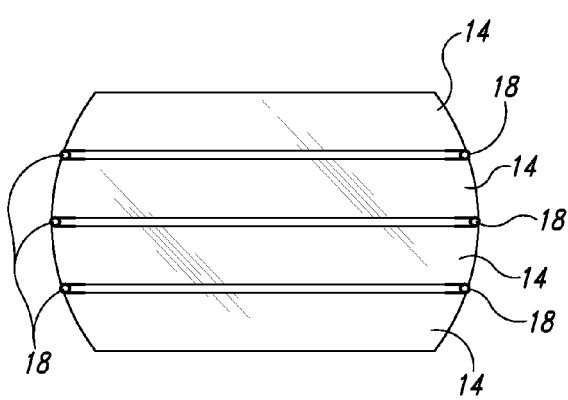
FIG. 3 is a top plan view of the sliced crystal puck shown in FIGS. 1C and 2, but wherein the two outermost crescent-shaped slabs have been removed and a plurality of first wires (spacers) have been placed between the slabs and at their outer edges in accordance with an embodiment of the present invention.

As best shown in FIG. 3, the inner slabs 14 are reassembled back into the shape of the puck 12 (less the removed pair of opposing end slab pieces 16), but spaced apart from each other by means of first height-wise wires 18 selectively positioned between the slabs 14 and along their outer edges as shown. The first wires 18 are of a selected diameter that preferably ranges from about 0.1 mm to 1.0 mm, or preferably from about 0.5 mm to 0.6 mm. The diameter of the wires 18 corresponds to the distance between adjacent pixels 11 of the final crystal block array 10. The wires 18 may be metallic or polymeric, and in some embodiments are composed of nylon.

Figure 4:
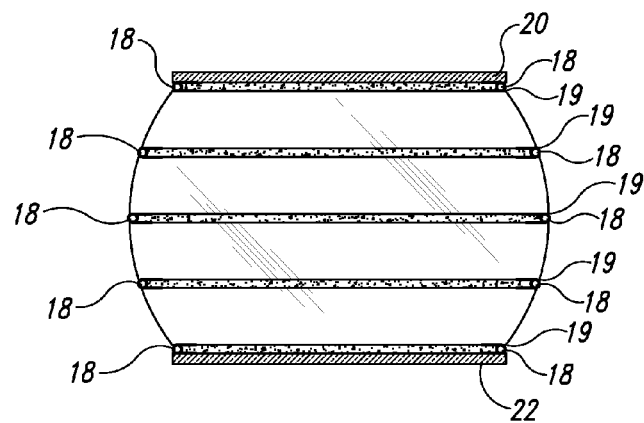
FIG. 4 is a top plan view of the sliced and spaced apart slabs shown in FIG. 3, but wherein a bonding agent has been placed in between each of the slabs, and between first and second glass end plates positioned adjacent to the outermost slabs to form a "sandwich" block in accordance with an embodiment of the present invention.
Figure 5:
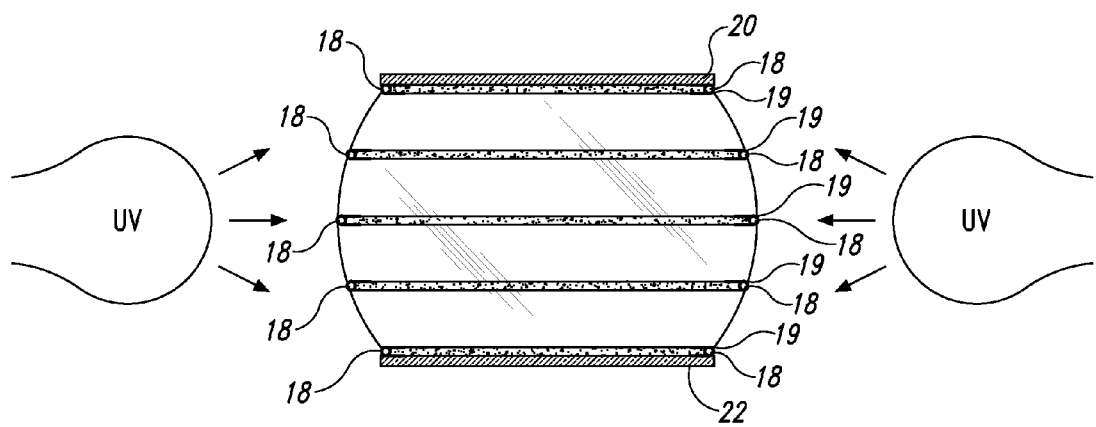
FIG. 5 is a top plan view of the bonded together slabs and glass end plates shown in FIG. 4, but wherein UV light is being applied to facilitate curing of the bonding agent in accordance with an embodiment of the present invention.

Next and as shown in FIG. 4, a curable liquid or semi-liquid bonding agent 19 (such as, for example, an optical cement made of a barium sulphate composition) is applied between each of the spaced apart slabs 14 and between first and second glass end plates 20, 22 that have been positioned adjacent to the two outermost slabs 14, all of which together form a "sandwich" block. As shown in FIG. 5, the bonding agent (cement) 19 positioned within the sandwich block is subsequently cured (hardened) by exposure to UV light for a selected period of time. In this regard, curing times are generally a function of at least the type of bonding agent used, its applied thickness, and on the intensity of the light source. Accordingly, curing times may be as short as five minutes or as long as several hours.

Figure 6:
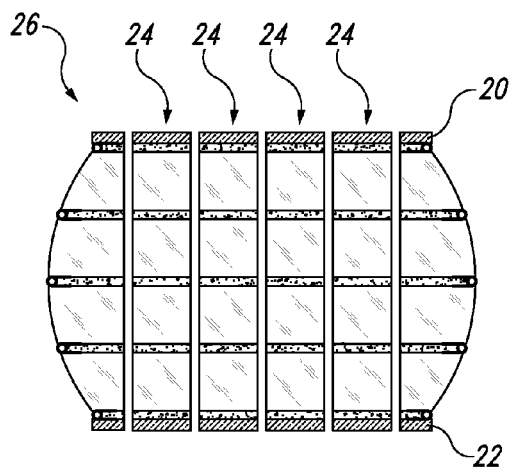
FIG. 6 is a top plan view of the bonded together slabs and glass end plates shown in FIG. 5, but after exposure to UV light and wherein the slabs have been cut lengthwise a plurality of times and in a transverse direction to the first plurality of lengthwise cuts to yield a plurality of crystal pixels (second slabs of sandwich construction) and a pair of outer pixel end pieces in accordance with an embodiment of the present invention.

Next and as shown in FIG. 6, the cured sandwich block 24 is selectively sliced (cut) a plurality of times perpendicular to the first and second protective glass end plates 20, 22 (as well as to the inner bonded together first slabs 14) to yield a plurality of second slabs of sandwich construction 24, and a pair of opposing end second slab pieces 26. The pair of opposing end second slab pieces 26 are removed and set aside for other applications. The remaining inner second slabs of sandwich construction 24 are each further lapped and polished on all of their flat surfaces (preferably to at least an optical finish of $\lambda/8$ or better) and readied for further assembly.

Figure 7:
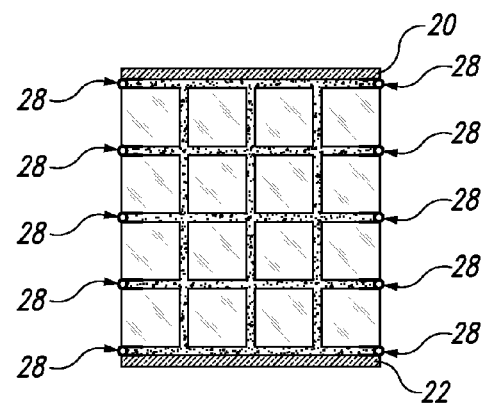
FIG. 7 is a top plan view of the plurality of crystal pixels (second slabs of sandwich construction) shown in FIG. 6, but wherein a plurality of second wires (spacers) have been placed between the second segmented slabs of sandwich construction and at their outer edges in accordance with an embodiment of the present invention.

As shown in FIG. 7, the inner second slabs of sandwich construction 24 are reassembled back into the shape of an unfinished crystal block array (less the removed pair of opposing end second slab pieces 26), but spaced apart from each other by means of second height-wise wires 28 selectively positioned between the second slabs of sandwich construction 24 and along their outer edges (and adjacent to the first and second glass end plates 20, 22, which have now been cut as described above) as shown. The plurality of second wires 28 may or may not be the same diameter as the plurality of first wires 18.

Figure 8:
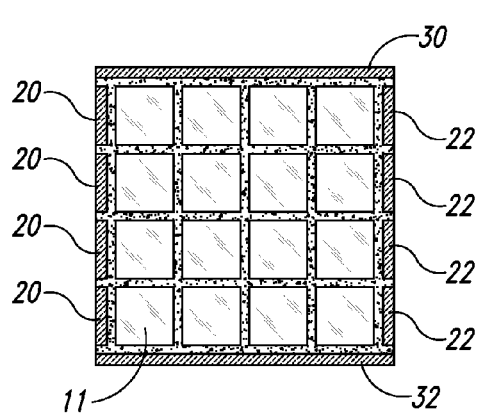
FIG. 8 is a top plan view of the unfinished crystal block array of FIG. 7, but wherein opposing third and fourth protective glass plates have been added and further bonding agent has been added.
Figure 9:
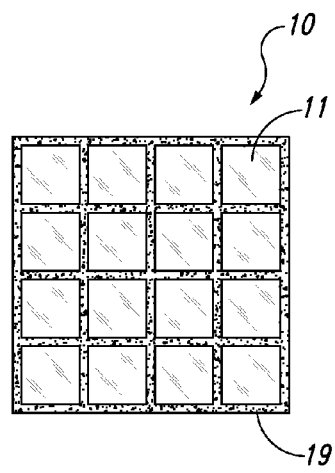
FIG. 9 is a top plan view a crystal block array in accordance with an embodiment of the present invention.
Figure 10:
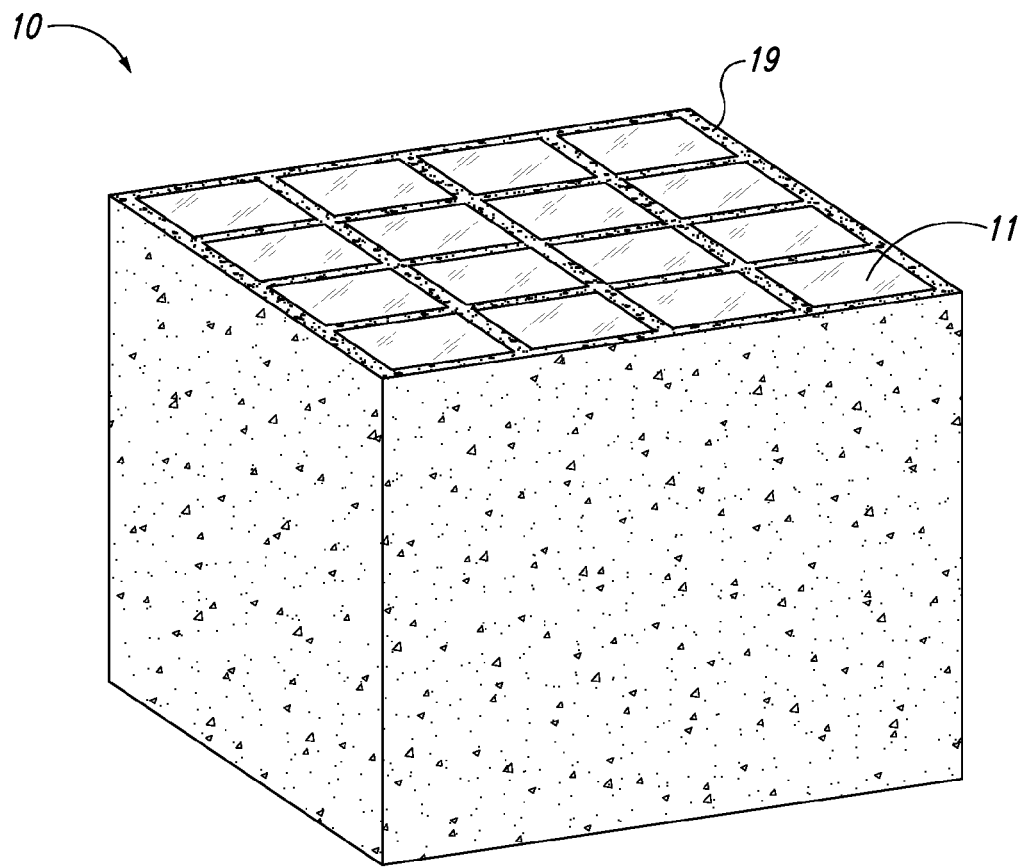
FIG. 10 is a perspective view the crystal block array shown in FIG. 9.

Next and as shown in FIG. 8, a pair of opposing third and fourth protective glass end plates 30, 32 are similarly positioned adjacent to and spaced apart from the unfinished crystal block array, and thereafter additional bonding agent 19 is poured into the space therebetween and subsequently cured as before. The first, second, third, and fourth protective glass end plates 20, 22, 30, 32 are all removed by use a diamond plate tool, for example, and all of the surfaces are cleaned to thereby yield (as shown in FIGS. 9 and 10) a crystal block array 10 having highly uniform and controlled spacing between individual pixels 11.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method of making a crystal block array, comprising at least the steps of:
   providing a selected crystal having a generally cylindrical form;
   cutting the selected crystal crosswise a plurality of times to yield a plurality of crystal pucks, with each crystal puck having a selected height;
   cutting at least one of the plurality of crystal pucks along a heightwise direction a plurality of times to yield a plurality of first crystal slabs;
   polishing the flat surfaces of at least four of the plurality of first crystal slabs to an optical finish;
   assembling the at least four of the plurality of polished first crystal slabs in a side-by-side and spaced apart relationship with respect to one another;
   positioning a plurality of first spacers between the at least four of the plurality of polished first crystal slabs and proximate to their edges, thereby defining a first series of first void spaces between the plurality of polished first crystal slabs;
   applying a first bonding agent between the at least four of the plurality of polished first crystal slabs so as to fill the first series of first void spaces, thereby defining a first layered optical block assembly;
   cutting the first layered optical block assembly along a lengthwise direction a plurality of times to yield a plurality of second crystal slabs of sandwich construction with the plurality of first spacers maintained in place;
   polishing the flat surfaces of at least four of the plurality of second crystal slabs of sandwich construction to an optical finish;
   assembling the at least four of the plurality of polished second crystal slabs of sandwich construction in a side-by-side and spaced apart relationship with respect to one another;
   positioning a plurality of second spacers between the at least four of the plurality of polished second crystal slabs of sandwich construction and proximate to their edges, thereby defining a second series of second void spaces between the plurality of polished second crystal slabs of sandwich construction;
   applying a second bonding agent between the at least four of the plurality of polished second crystal slabs of sandwich construction so as to fill the second series of second void spaces, thereby defining a second layered optical block assembly; and
   removing the plurality of first and second spacers to yield the crystal block array.

2. The method of claim 1 wherein the selected crystal is a boule of a scintillation substance.

3. The method of claim 1 wherein the first spacers and the second spacers are elongated wires of the same diameter.

4. The method of claim 3 wherein the first spacers and the second spacers are elongated wires composed of nylon.

5. The method of claim 1 wherein the first and second bonding agents are the same material.

6. The method of claim 1 wherein the first and second bonding agents are composed of a barium sulphate composition.

7. The method of claim 1, further comprising the steps of positioning first and second end plates in a side-by-side and spaced apart relationship with respect to the plurality of at least four first crystal slabs, and applying the first bonding agent between the first and second end plates and the at least four of the plurality of first crystal slabs.

8. The method of claim 7, further comprising a step of curing the first bonding agent by exposure to UV light.

9. The method of claim 8, further comprising the steps of positioning third and fourth end plates in a side-by-side and spaced apart relationship with respect to the plurality of at least four second crystal slabs of a sandwich construction, and applying the second
   bonding agent between the third and fourth end plates and the at least four of the plurality of second crystal slabs of sandwich construction.

10. The method of claim 9, further comprising a step of curing the second bonding agent by exposure to UV light.

11. The method of claim 10 wherein the first, second, third, and fourth end plates are composed of glass.

12. The method of claim 10, further comprising a step of removing the first, second, third, and fourth end plates to yield the crystal block array.

13. A crystal block array made in accordance with the method of claim 1.

\* \* \* \* \*